US009815128B1

(12) United States Patent
Jensen

(10) Patent No.: US 9,815,128 B1
(45) Date of Patent: Nov. 14, 2017

(54) EXTRACTION TONGS WITH REPLACEABLE JAW TIPS

(71) Applicant: Colten D. Jensen, Green Bay, WI (US)

(72) Inventor: Colten D. Jensen, Green Bay, WI (US)

(73) Assignee: S.A.S. OF LUXEMBURG, LTD., Luxemburg, WI (US)

( * ) Notice: Subject to any disclaimer, the term of this patent is extended or adjusted under 35 U.S.C. 154(b) by 0 days.

(21) Appl. No.: 15/374,046

(22) Filed: Dec. 9, 2016

(51) Int. Cl.
B25J 15/08 (2006.01)
B23D 35/00 (2006.01)
B23D 31/00 (2006.01)

(52) U.S. Cl.
CPC ......... *B23D 35/001* (2013.01); *B23D 31/008* (2013.01); *B23D 35/002* (2013.01)

(58) Field of Classification Search
CPC .. B23D 35/001; B23D 35/002; B23D 31/008; B25J 15/08
USPC ..... 294/86.4, 203, 902; 901/39; 37/457, 458
See application file for complete search history.

(56) References Cited

U.S. PATENT DOCUMENTS

| | | | | |
|---|---|---|---|---|
| 3,063,176 A * | 11/1962 | Larson | ....................... | E02F 9/28 172/713 |
| 3,623,247 A * | 11/1971 | Stepe | .................... | E02F 9/2833 172/713 |
| 3,959,901 A * | 6/1976 | Klett | ..................... | E02F 9/2833 172/699 |
| D243,843 S * | 3/1977 | Edwards | ........................ | D15/29 |
| 4,542,929 A * | 9/1985 | Possinger | ................. | B66C 3/16 294/198 |
| 4,776,113 A * | 10/1988 | Bedford | ................ | E02F 9/2825 172/701.2 |
| 4,848,013 A * | 7/1989 | Bowman | ............... | E02F 9/2833 37/457 |
| 5,474,242 A | 12/1995 | Rafn | | |
| 6,276,733 B1 * | 8/2001 | Moilanen | ............. | B25J 15/0475 294/116 |
| 8,650,759 B2 | 2/2014 | Johnson et al. | | |
| 9,132,490 B2 | 9/2015 | Ramun | | |
| D740,861 S | 10/2015 | Aerts et al. | | |
| D779,565 S * | 2/2017 | Jensen | .......................... | D15/28 |
| 2005/0235498 A1 * | 10/2005 | Cossette | ............. | B23D 31/008 30/134 |
| 2008/0086920 A1 * | 4/2008 | Lim | ...................... | E02F 3/3677 37/406 |
| 2012/0299321 A1 * | 11/2012 | Raihala | ..................... | B66C 3/04 294/201 |

(Continued)

*Primary Examiner* — Paul T Chin
(74) *Attorney, Agent, or Firm* — Donald J. Ersler

(57) ABSTRACT

Extraction tongs with replaceable jaw tips include jaw tips with mating gripping projections. Each extraction tong includes a plurality of inward extending teeth. A thickness of the extraction tong is reduced at a bottom to form a jaw tip extension. A substantially triangular projection extends outward from opposing sides of the jaw tip extension. A plurality of holes are formed through the jaw tip extension. Each jaw tip includes a tong slot, which is sized to receive the thickness of the jaw tip extension. A substantially triangular slot is formed in opposing walls of the tong slot to receive the two substantially triangular projections. A plurality of counterbore holes are formed in opposing sides of the jaw tip. A first lengthwise projection is formed on a gripping surface of the first jaw tip. A pair of second lengthwise projections are formed on a gripping surface of the second jaw tip.

19 Claims, 7 Drawing Sheets

(56) References Cited

U.S. PATENT DOCUMENTS

2013/0068079 A1 3/2013 Kimura et al.
2015/0308076 A1* 10/2015 Christenson ............ E02F 3/965
                                                                            30/134

* cited by examiner

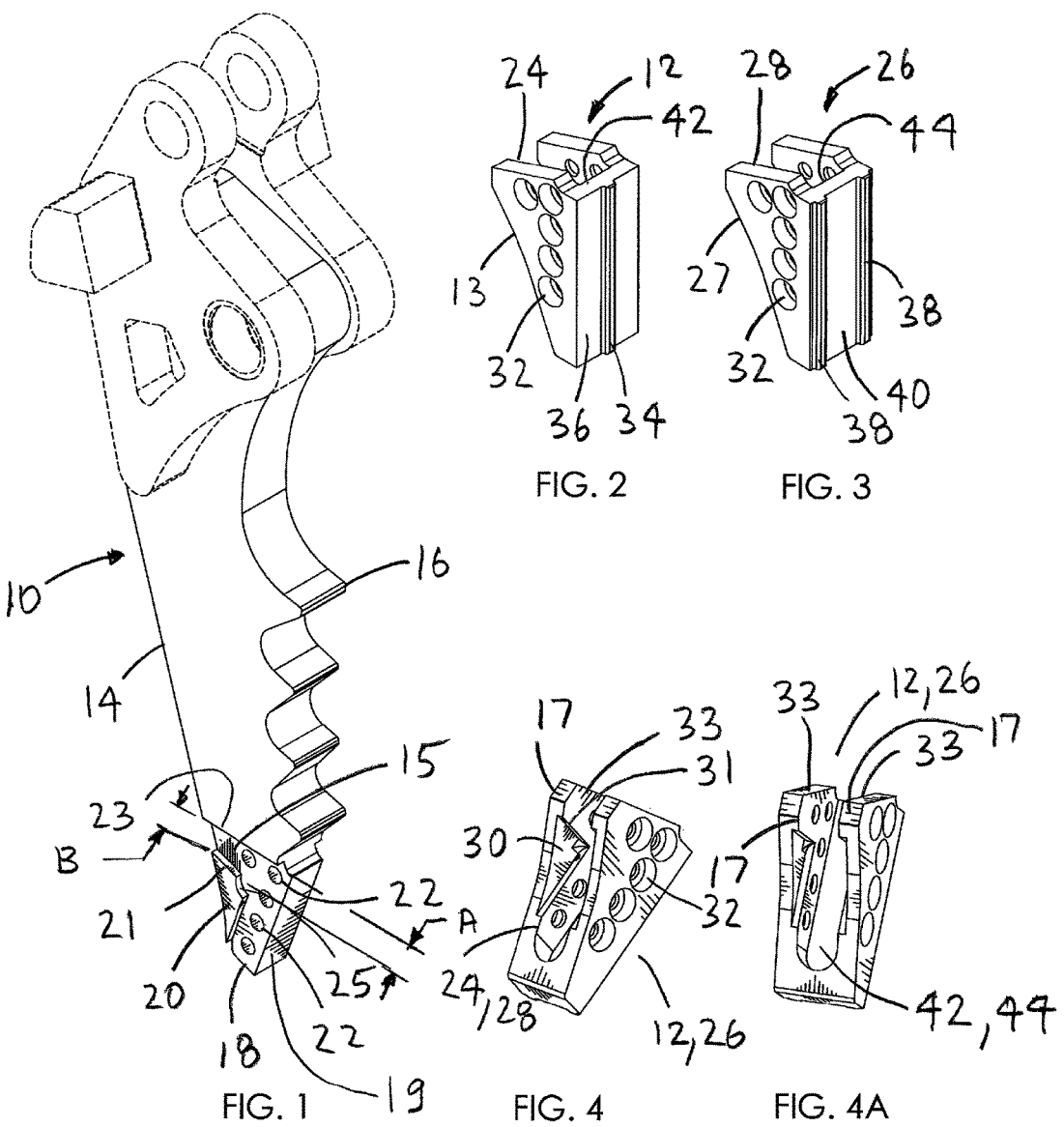

EXTRACTION TONGS WITH REPLACEABLE JAW TIPS

BACKGROUND OF THE INVENTION

1. Field of the Invention

The present invention relates generally to recycling and more specifically to extraction tongs with replaceable jaw tips, which includes jaw tips with mating gripping projections.

2. Discussion of the Prior Art

Extraction tongs are a gripping portion of excavator grapples. The excavator grapple may be used to extract objects from an engine bay of a salvaged vehicle. The jaw tips at an end of the extraction tongs will wear after a period of time. The jaw tips need to be replaceable, but must also be fully secured to the extraction tong. U.S. Pat. No. 5,474,242 to Rafn discloses demolition tools with jaws having replaceable working surfaces. Patent no. 2013/0068079 to Kimura et al. discloses a demolition cutter. U.S. Pat. No. 8,650,759 to Johnson et al. discloses a metal demolition shears with indexable, integrated wear plate/piercing tip. U.S. Pat. No. 9,132,490 to Ramun discloses an interlocking tip for demolition and construction equipment. Pat. No. D740861 to Aerts discloses a jaw tip.

Accordingly, there is a clearly felt need in the art for extraction tongs with replaceable jaw tips, which includes jaw tips with mating gripping projections.

SUMMARY OF THE INVENTION

The present invention provides extraction tongs with replaceable jaw tips, which include jaw tips with mating gripping projections. Each extraction tong includes a tapered body with a plurality of inward extending teeth. A thickness of the extraction tong is reduced at a bottom thereof. The thickness is reduced on opposing sides of the extraction tong to form a jaw tip extension. A substantially triangular projection extends outward from opposing sides of the jaw tip extension. A plurality of extension holes are formed through the thickness of the jaw tip extension. Each jaw tip includes a tong slot, which is sized to receive the thickness of the jaw tip extension. A substantially triangular slot is formed in opposing walls of the tong slot to receive the two substantially triangular projections. A plurality of counterbore holes are formed in opposing sides of the jaw tip. The plurality of counterbore holes are concentric with the plurality of extension holes formed through the thickness of the jaw tip extension. A first lengthwise projection is formed on a gripping surface of the first jaw tip. A pair of second lengthwise projections are formed on a gripping surface of the second jaw tip. The first lengthwise projection fits between the pair of second lengthwise projections.

Accordingly, it is an object of the present invention to provide extraction tongs with replaceable jaw tips, which includes jaw tips with mating gripping projections.

These and additional objects, advantages, features and benefits of the present invention will become apparent from the following specification.

BRIEF DESCRIPTION OF THE DRAWINGS

FIG. 1 is a perspective view of an extraction tong in accordance with the present invention.

FIG. 2 is a perspective view of a first jaw tip in accordance with the present invention.

FIG. 3 is a perspective view of a second jaw tip in accordance with the present invention.

FIG. 4 is a rear perspective view of a first or second jaw tip in accordance with the present invention.

FIG. 4a is a rear perspective view of a first or second jaw tip position at a different perspective angle than FIG. 4 in accordance with the present invention.

DETAILED DESCRIPTION OF THE PREFERRED EMBODIMENTS

Figure 5:
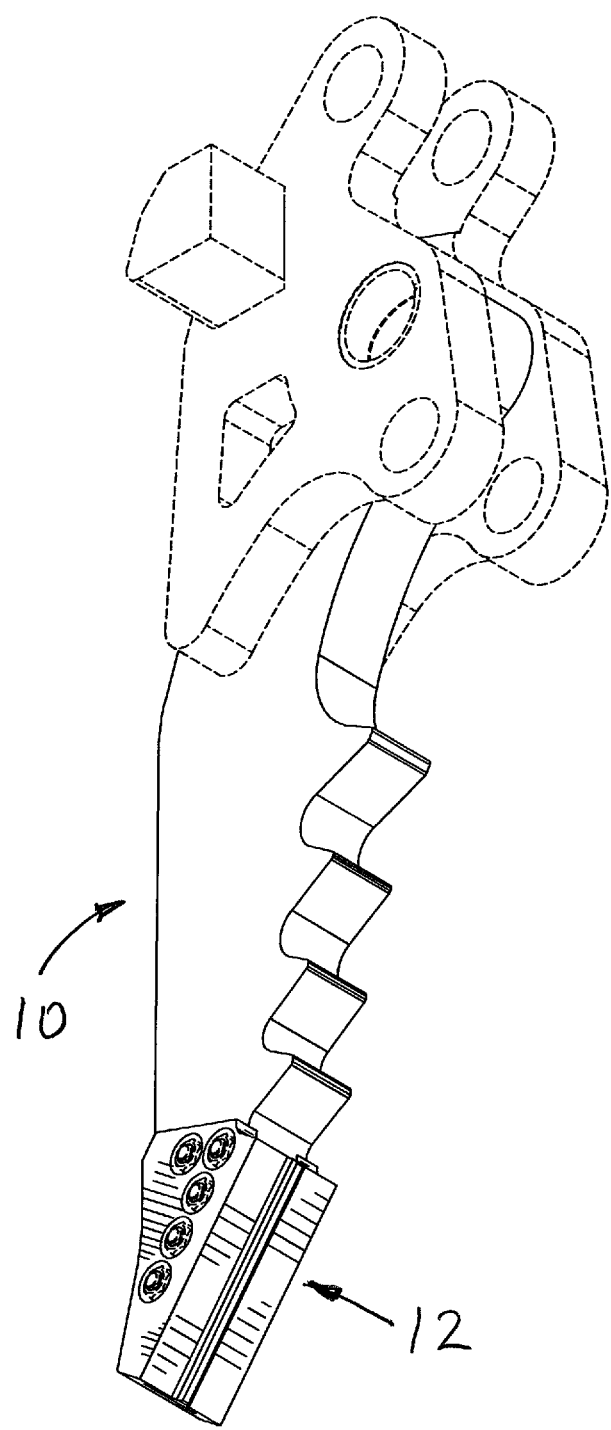
FIG. 5 is a perspective view of a first jaw tip attached to an extraction tong in accordance with the present invention.

With reference now to the drawings, and particularly to FIG. 5, there is shown a perspective view of an extraction tong 10 with a first jaw tip 12 attached thereto. With reference to FIGS. 1-4 and 6-12, each extraction tong 10 includes a tapered body 14 with a plurality of teeth 16 formed on an inward surface thereof. A thickness of the extraction tong 10 is reduced at a bottom thereof. The thickness is reduced on opposing sides of the extraction tong 10 to form a jaw tip extension 18. A planar contact surface 19 is formed on a front of the jaw tip extension 18. A substantially triangular projection 20 extends outward from opposing sides of the jaw tip extension 18. A top edge 21 of the substantially triangular projection 20 is not parallel with a top edge 23 of the jaw tip extension 18. A distance between the top edge 21 and the top edge 23 form a wedge slot 15. A dimension "A" at an entrance of the wedge slot 15 edge 23 is greater than a dimension "B" at an end thereof. A plurality of extension holes 22 are formed through the thickness of the jaw tip extension 18.

The first jaw tip 12 includes a substantially triangular shaped body 13 and a first tong slot 24 formed in a rear of the first jaw tip 12 to receive the thickness of the jaw tip extension 18. A second jaw tip 26 includes a substantially triangular shaped body 27 and a second tong slot 28 formed in a rear of the second jaw tip 26 to receive the thickness of the jaw tip extension 18. A substantially triangular slot 30 is formed in opposing walls of the first and second tong slots 24, 28 to receive the two substantially triangular projections 20. The substantially triangular slot 30 includes a top edge 31. A top edge 33 of the first and second jaw tips 12, 26 is not parallel to top edge 31 of the substantially triangular slot 30. The top edge 31 and the top edge 33 form a wedge projection 17. When the first and second jaw tips 12, 26 are pressed on to the jaw tip extension 18, the wedge projection 17 forms a wedge fit with the wedge slot 15 to retain the jaw tips 12, 26 on the jaw tip extension 18. A corner relief 25 is preferably formed on a front of the substantially triangular projection 20 to provide clearance for a corner of the substantially triangular slot 30.

Figure 6:
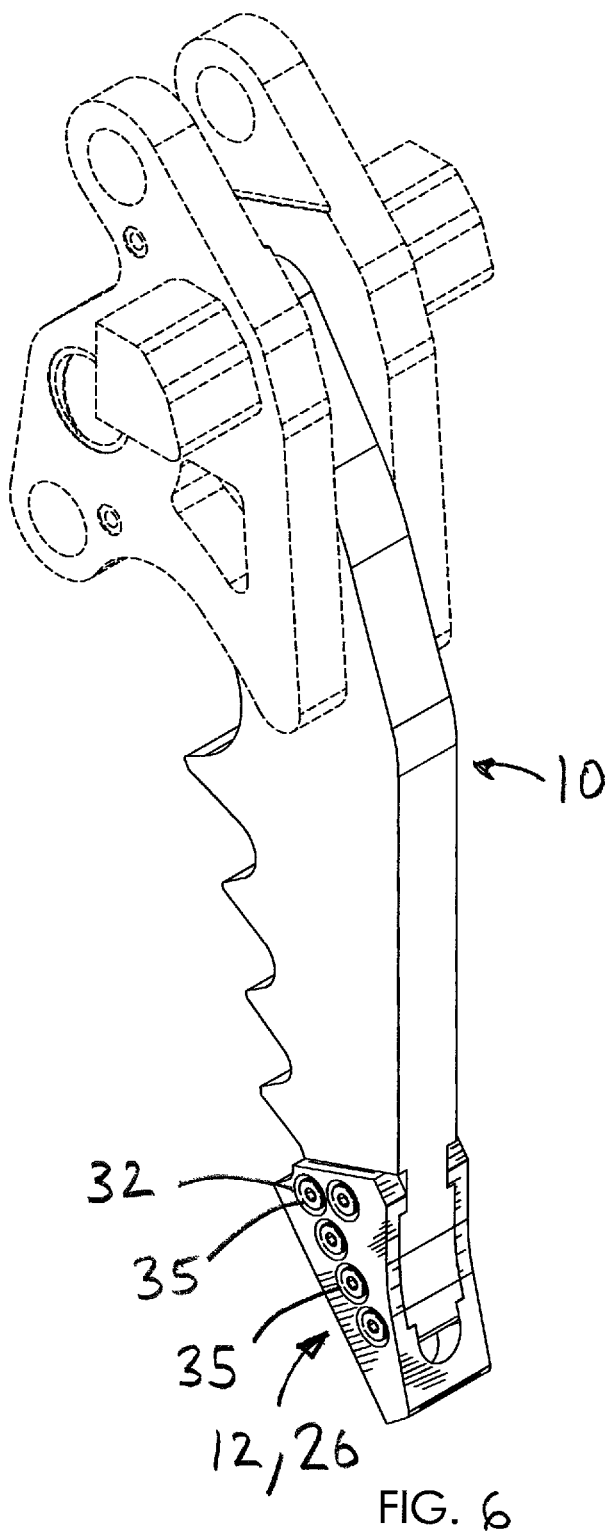
FIG. 6 is a rear perspective view of a first or second jaw tip attached to an extraction tong in accordance with the present invention.
Figure 7:
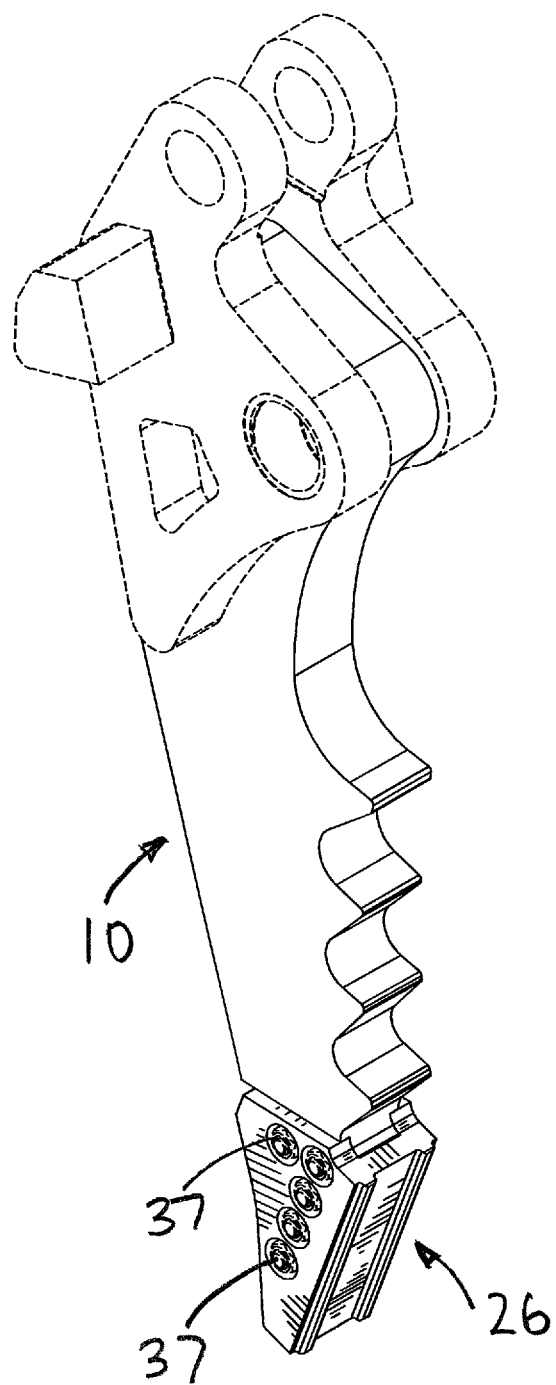
FIG. 7 is a perspective view of a second jaw tip attached to an extraction tong in accordance with the present invention.
Figure 8:
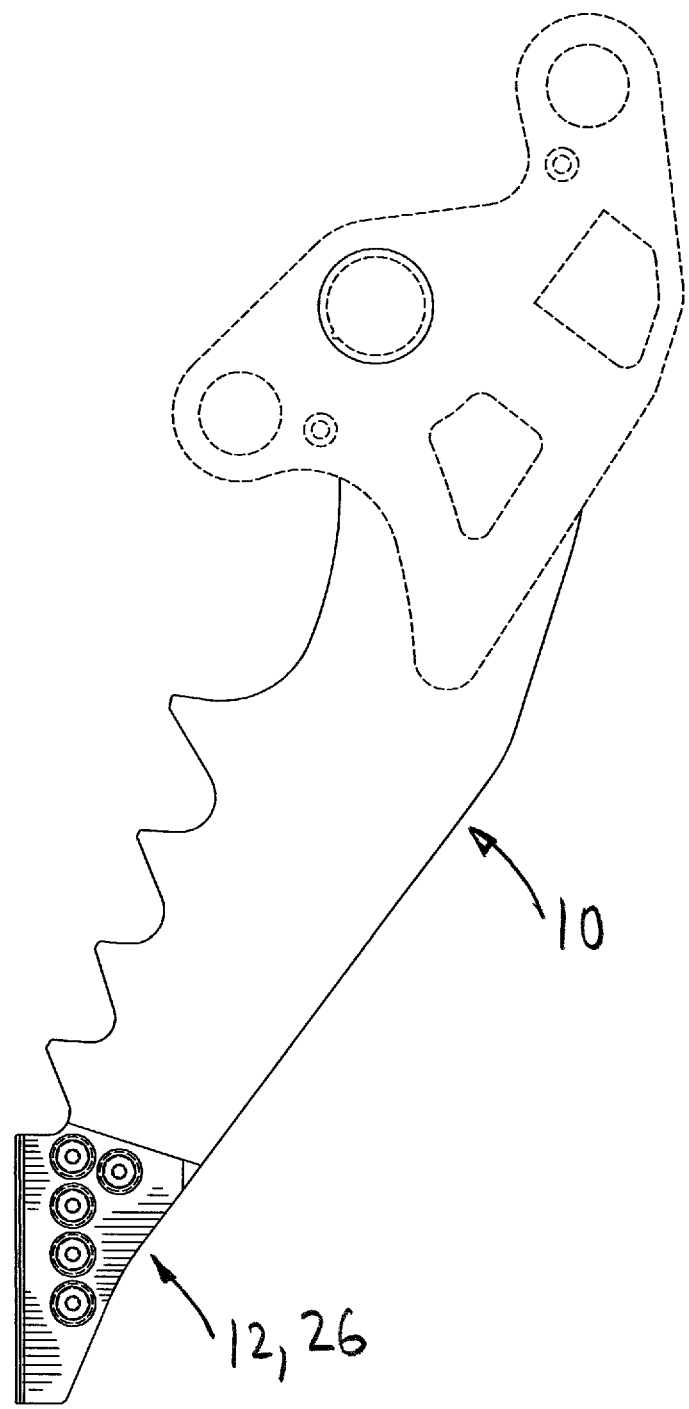
FIG. 8 is a side view of a first or second jaw tip attached to an extraction tong in accordance with the present invention.
Figure 9:
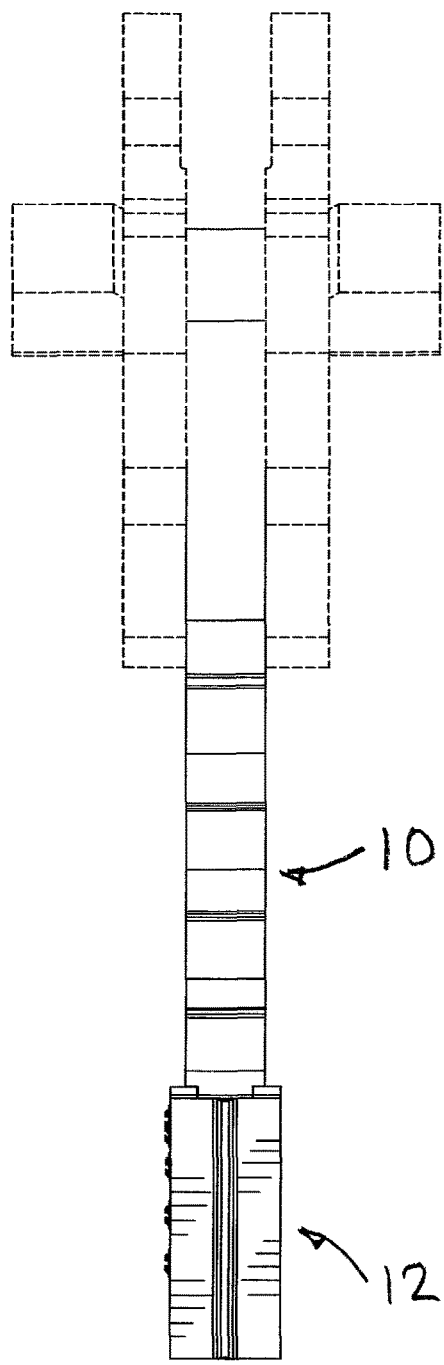
FIG. 9 is a front view of a first jaw tip attached to an extraction tong in accordance with the present invention.
Figure 10:
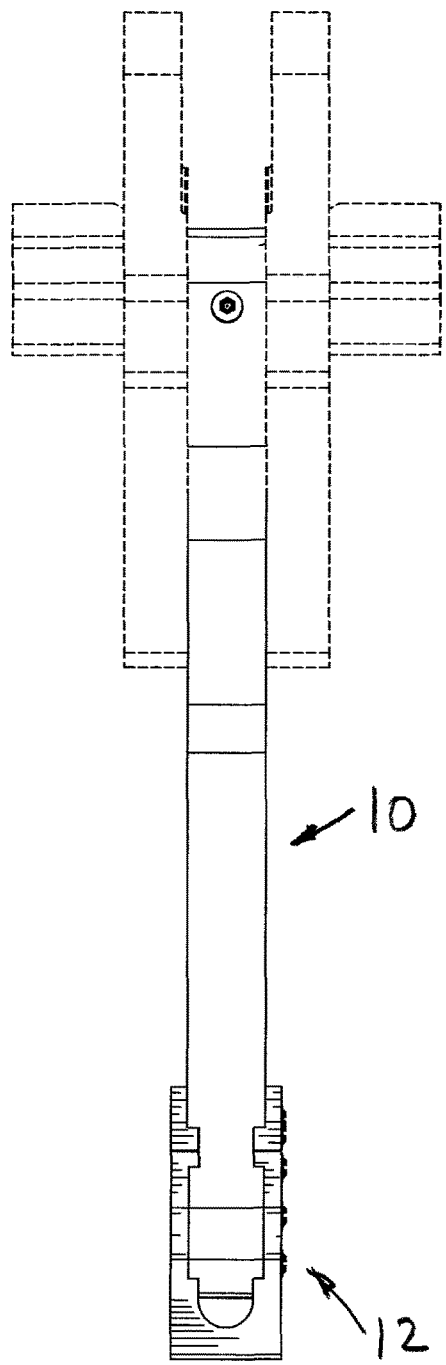
FIG. 10 is a rear view of a first jaw tip attached to an extraction tong in accordance with the present invention.
Figure 11:
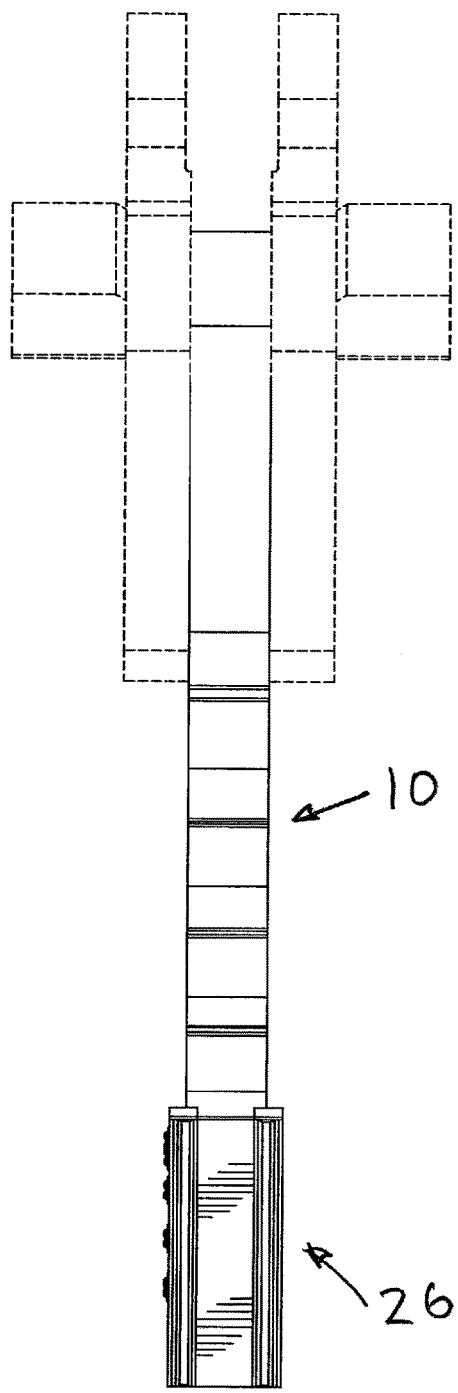
FIG. 11 is a front view of a second jaw tip attached to an extraction tong in accordance with the present invention.
Figure 12:
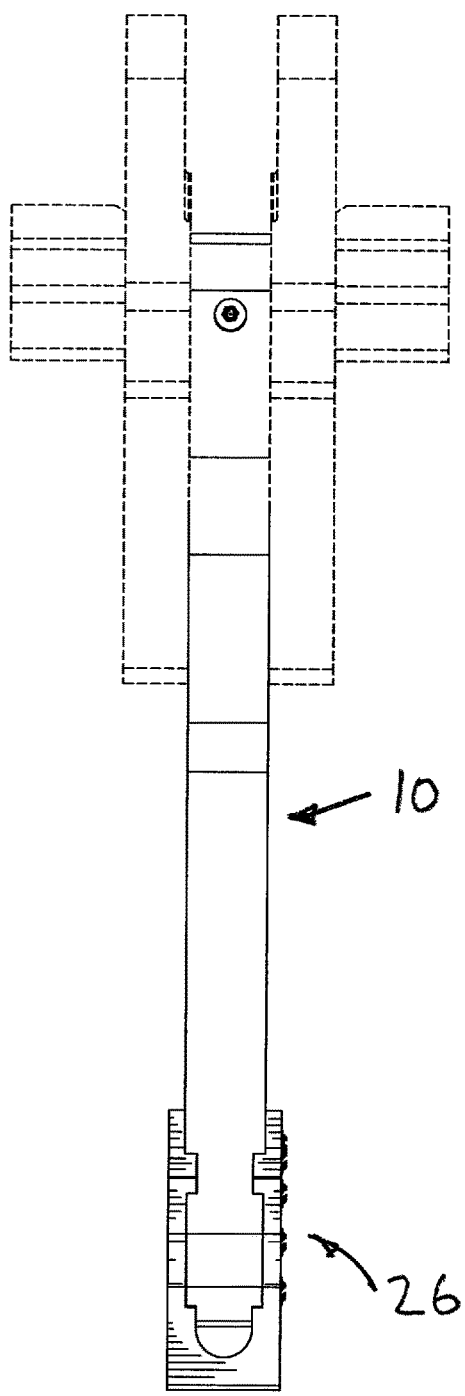
FIG. 12 is a rear view of a second jaw tip attached to an extraction tong in accordance with the present invention.

A plurality of counterbore holes 32 are formed in opposing sides of the first and second jaw tips 12, 26. The plurality of counterbore holes 32 are concentric with the plurality of extension holes 22. With reference to FIGS. 6-7, a plurality of bolts 35 and a plurality of hex nuts 37 are used to secure the first and second jaw tips 12, 26 to the extraction tong 10. However, other types of fasteners may also be used. The counterbore holes 32 allow the plurality of bolts 35 and hex nuts 37 to be substantially flush with the opposing sides of the first and second jaw tips 12, 26. A first lengthwise projection 34 is formed on a gripping surface 36 of the first jaw tip 12. A pair of second lengthwise projections 38 are formed on a gripping surface 40 of a second jaw tip 26. The first lengthwise projection 34 fits between the pair of second lengthwise projections 38. The first and second gripping surfaces 38, 40 are preferably flat or planar. A first inner planar contact surface 42 is formed on a bottom of the first tong slot 24. A second inner planar contact surface 44 is formed on a bottom of the second tong slot 28. The first and second inner planar contact surfaces 42, 44 make physical contact with the planar contact surface 19 of the jaw tip extension 18, when the first and second jaw tips 12, 26 are attached to the jaw tip extension 18.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. An excavator grapple includes a pair of extraction tongs, a jaw tip is removably secured to a jaw tip extension of each one of the pair of extraction tongs, a pair of projections extend from opposing sides of the jaw tip extension, a plurality of extension holes are formed through the jaw tip extension, said jaw tip is retained on the jaw tip extension, said jaw tip comprising:
    a substantially triangular shaped body includes a front, a rear and two opposing sides, a tong slot is formed in said rear of said jaw tip, wherein said tong slot is sized to receive the jaw tip extension, a projection slot is formed in opposing side walls of said tong slot to receive the pair of projections, a plurality of jaw holes are formed in opposing sides of said jaw tip, wherein a plurality of fasteners are inserted through said plurality of jaw holes and extension holes to retain said jaw tip on the extraction tong.

2. The jaw tip of claim 1 wherein:
said front of said substantially triangular shaped body is planar.

3. The jaw tip of claim 1 wherein:
at least one substantially lengthwise projection is formed on said front of said substantially triangular shaped body.

4. The jaw tip of claim 1 wherein:
said tong slot is substantially triangular.

5. The jaw tip of claim 1 wherein:
an inner planar contact surface is formed on a bottom of said tong slot, a planar surface is formed on a front of the jaw tip extension, wherein said inner planar contact surface makes physical contact with the planar contact surface of the jaw tip extension when said jaw tip is fastened to said jaw tip extension.

6. The jaw tip of claim 1 wherein:
said tong slot includes a tong top edge, the projection includes a projection top edge, said jaw tip includes a jaw top edge, the jaw tip extension includes an extension top edge, a wedge slot is formed between the projection top edge and the extension top edge, a wedge projection is formed between said tong top edge and said jaw top edge, wherein a wedge fit is created between said wedge projection and the wedge slot when said jaw tip is attached to the jaw tip extension.

7. An excavator grapple includes a pair of extraction tongs, a first jaw tip and a second jaw tip are removably secured to jaw tip extensions of the pair of extraction tongs, a pair of projections extend from opposing sides of the jaw tip extensions, a plurality of extension holes are formed through the jaw tip extensions, said first and second jaw tips each comprising:
    a substantially triangular shaped body includes a front, a rear and two opposing sides, a tong slot is formed in said rear of said jaw tip, wherein said tong slot is sized to receive the jaw tip extension, a projection slot is formed in opposing side walls of said tong slot to receive the pair of projections, a plurality of jaw holes are formed in opposing sides of said jaw tip, wherein a plurality of fasteners are inserted through said plurality of jaw holes and extension holes to retain said jaw tip on the extraction tong, a first lengthwise projection is formed on said front of said first jaw tip, two second lengthwise projections are formed on said front of said second jaw tip, said first lengthwise projection fits between said two second lengthwise projections.

8. The jaw tip of claim 7 wherein:
said front of said substantially triangular shaped body is planar.

9. The jaw tip of claim 7 wherein:
said tong slot is substantially triangular.

10. The jaw tip of claim 7 wherein:
an inner planar contact surface is formed on a bottom of said tong slot, a planar surface is formed on a front of the jaw tip extension, wherein said inner planar contact surface makes physical contact with the planar contact surface of the jaw tip extension when one of said first and second jaw tips are fastened to the jaw tip extension.

11. The jaw tip of claim 7 wherein:
said tong slot includes a tong top edge, the projection includes a projection top edge, said jaw tip includes a jaw top edge, the jaw tip extension includes an extension top edge, a wedge slot is formed between the projection top edge and the extension top edge, a wedge projection is formed between said tong top edge and said jaw top edge, wherein a wedge fit is created between said wedge projection and the wedge slot when said jaw tip is attached to the jaw tip extension.

12. An excavator grapple includes a pair of extraction tongs, each one of said pair of extraction tongs includes a replaceable jaw tip comprising:
    said extraction tong includes a tapered body, a thickness of said extraction tong is reduced at a bottom thereof to form a jaw tip extension, a pair of projections extend from opposing sides of said jaw tip extension, a plurality of holes are formed through a thickness of said jaw tip extension; and
    said jaw tip includes a front, a rear and two opposing sides, a tong slot is formed in said rear of said jaw tip, wherein said tong slot is sized to receive the jaw tip extension, a projection slot is formed in opposing side walls of said tong slot to receive the pair of projections, a plurality of jaw holes are formed in opposing sides of said jaw tip, wherein a plurality of fasteners are inserted through said plurality of jaw holes and extension holes to retain said jaw tip on the extraction tong.

13. The jaw tip of claim 12 wherein:

said front of said jaw tip is planar.

14. The jaw tip of claim 12 wherein:

at least one substantially lengthwise projection is formed on said front of said jaw tip.

15. The jaw tip of claim 12 wherein:

said pair of projections have a substantially triangular shape.

16. The jaw tip of claim 12 wherein:

said plurality of jaw holes are counterbored.

17. The jaw tip of claim 12 wherein:

a plurality of teeth are formed on an inward surface of said extraction tong.

18. The jaw tip of claim 12 wherein:

an inner planar contact surface is formed on a bottom of said tong slot, a planar surface is formed on a front of said jaw tip extension, wherein said inner planar contact surface makes physical contact with said planar contact surface of the jaw tip extension when said jaw tip is fastened to said jaw tip extension.

19. The jaw tip of claim 12 wherein:

said tong slot includes a tong top edge, said projection includes a projection top edge, said jaw tip includes a jaw top edge, said jaw tip extension includes an extension top edge, a wedge slot is formed between said projection top edge and said extension top edge, a wedge projection is formed between said tong top edge and said jaw top edge, wherein a wedge fit is created between said wedge projection and said wedge slot when said jaw tip is attached to said jaw tip extension.

\* \* \* \* \*